(12) United States Patent
Badenes et al.

(10) Patent No.: US 8,590,017 B2
(45) Date of Patent: Nov. 19, 2013

(54) PARTIAL AUTHENTICATION FOR ACCESS TO INCREMENTAL DATA

(75) Inventors: Hernan Badenes, Neuquen (AG); Mateo Nicolas Bengualid, Cordoba (AG); Julian Ariel Cerruti, Buenos Aires (AG); Hongxia Jin, San Jose, CA (US); Jeffrey Scott Pierce, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 153 days.

(21) Appl. No.: 13/036,639

(22) Filed: Feb. 28, 2011

(65) Prior Publication Data
US 2012/0222093 A1   Aug. 30, 2012

(51) Int. Cl.
*G06F 7/04*       (2006.01)
*G06F 15/16*      (2006.01)

(52) U.S. Cl.
USPC .............. 726/4; 726/2; 726/5; 726/6; 726/18; 726/21; 713/151; 713/168; 713/183; 713/184

(58) Field of Classification Search
USPC ...................... 726/2–8, 16–21; 713/151, 168; 713/183–184
See application file for complete search history.

(56) References Cited

U.S. PATENT DOCUMENTS

| | | | |
|---|---|---|---|
| 7,624,270 B2 | 11/2009 | Pathan et al. | |
| 2004/0030932 A1* | 2/2004 | Juels et al. | 713/202 |
| 2004/0062400 A1* | 4/2004 | Sovio et al. | 380/286 |
| 2004/0177280 A1* | 9/2004 | Maruyama et al. | 713/202 |
| 2005/0044425 A1* | 2/2005 | Hypponen | 713/202 |
| 2005/0125663 A1 | 6/2005 | Funk | |
| 2006/0085845 A1* | 4/2006 | Davis et al. | 726/6 |
| 2007/0022299 A1* | 1/2007 | Yoshimura | 713/183 |
| 2007/0044143 A1* | 2/2007 | Zhu et al. | 726/8 |
| 2007/0250920 A1 | 10/2007 | Lindsay | |
| 2007/0253553 A1 | 11/2007 | Abdul Rahman | |
| 2008/0072304 A1* | 3/2008 | Jennings et al. | 726/11 |
| 2008/0147821 A1 | 6/2008 | Dietrich et al. | |
| 2008/0209222 A1* | 8/2008 | Narayanaswami et al. | 713/184 |
| 2008/0301791 A1* | 12/2008 | Smith et al. | 726/7 |
| 2009/0089867 A1* | 4/2009 | Weatherford et al. | 726/6 |
| 2009/0193263 A1 | 7/2009 | Gnech et al. | |
| 2009/0259588 A1* | 10/2009 | Lindsay | 705/40 |
| 2009/0293119 A1 | 11/2009 | Jonsson | |
| 2009/0319786 A1 | 12/2009 | Viscomi et al. | |

FOREIGN PATENT DOCUMENTS

JP      2006065708 A      3/2006

\* cited by examiner

*Primary Examiner* — Andrew L Nalven
*Assistant Examiner* — Amir Mehrmanesh
(74) *Attorney, Agent, or Firm* — Lieberman & Brandsdorfer, LLC

(57) ABSTRACT

Embodiments of the invention relate to partial authentication to access incremental information. An aspect of the invention concerns a method of authorizing access to information that comprises providing an initial segment of a password wherein the password includes password segments each associated with an incremental portion of the information. In response to the initial password segment satisfying an expected value, the method may authorize access to the information portion associated with the initial password segment. The method may authorize access to other information portions associated with subsequent segments of the password in response to the subsequent password segments satisfying respectively expected values.

17 Claims, 9 Drawing Sheets

PARTIAL AUTHENTICATION FOR ACCESS TO INCREMENTAL DATA

Embodiments of the invention relate generally to computer security, and more particularly, to authorizing access to incremental information in a computer system in response to partial authentication of access credentials.

BACKGROUND

Mobile client devices and applications such as smart phones and their applications are increasingly being used to access data repositories that were traditionally set up to support larger clients, such as laptop and desktop computers. A key difference in the operation between these two categories of client devices and applications is the amount and level of information detail that they typically access. Users of mobile devices and applications generally need to access certain specific information in a database quickly, download small amounts of data from the database, or communicate with a private computer system in short interactions while away from the office or home. For example, a user may be interested in signing into a private enterprise computer to quickly check for new electronic messages, forward office phone calls to a voice mail system, or look up the status of a pending financial transaction.

Conventional information handling systems often use an authentication process such as password verification to grant a client access to information in a database. A password is a unique string of characters that a user has previously created for the user or a user's client in order to be authorized to access a target system. To increase the level of protection, it is often desirable to have a password that includes a relatively long and unique combination of alphabet characters and numbers that is difficult to guess. However, long and complex passwords are generally not suitable for mobile client devices and applications due to their limited input capability. For example, these mobile devices may have small display screens, simplified keypads, limited network bandwidth, or minimum graphics support.

The limited resources in mobile devices generally require the users to spend more time in entering a sufficiently secure password or pass phrase. In addition, the applications that operate on mobile user devices are often designed to support short commands and brief interactions with remotely connected systems to access specific information in the systems.

One possible approach for simplifying access to information from mobile devices utilizes a caching of either an access token or the password itself. For example, a Web application for smart phones may allow users to stay logged in for two weeks after being authenticated to access a server by caching the phones' access token. Other smart phone applications may save a user's password on the device and then log in on the user's behalf. Both approaches are problematic for business enterprises because corporate IT departments are concerned about the consequences of lost smart phones, particularly the potential for compromised data or services. Requiring that users enter a password during each session provides some minimum level of protection even in the event of a lost device.

While passwords are problematic, eliminating them or reducing their complexity is often not an option for enterprises that want to maintain some minimum level of security around business information. Further, in many cases, users of mobile clients typically need to access more detailed information only if there is new information or information that they need to act on rather than accessing the full information initially.

BRIEF SUMMARY

Exemplary embodiments of the invention relate to the authentication of devices and applications to access incremental information in a computer system based on partial passwords. The exemplary embodiments of the invention may be used for portable user devices with limited user interface and system resources, among other applications.

One aspect of the invention concerns a method for authorizing access to information. The method may comprise supplying a first segment of a password wherein the password comprises a plurality of segments each associated with an incremental portion of the information. In response to the first password segment satisfying an expected first value, the method may authorize access to the information portion associated with the first password segment. The method may further comprise authorizing access to an information portion associated with a subsequent password segment in response to receiving the subsequent password segment and the subsequent password segment satisfying an expected subsequent value.

Another aspect of the invention concerns a system for authorizing access to information. The system may comprise a server, a client coupled to the server by a network, and a client logic component for supplying to the server a first segment of a password, wherein the password comprises a plurality of segments each associated with an incremental portion of the information of interest. The system may comprise a logic component for authorizing access to the information portion associated with the first password segment, in response to the first password segment satisfying an expected first value. The system may further include a logic component for authorizing access to the information portion associated with a subsequent password segment in response to receiving the subsequent password segment and the subsequent password segment satisfying an expected subsequent value.

A further aspect of the invention concerns a computer program product for authorizing access to information. The computer program product comprises a computer readable storage medium having computer readable program code embodied therewith. The computer program product may comprise computer readable program code configured to provide a first segment of a password wherein the password comprises a plurality of segments each associated with an incremental portion of the information. The computer program product may additionally comprise computer readable program code configured to authorize access to an information portion associated with a subsequent password segment in response to receiving the subsequent password segment and the subsequent password segment satisfying an expected subsequent value.

The details of the preferred embodiments of the invention, both as to its structure and operation, are described below in the Detailed Description section in reference to the accompanying drawings. The Summary is intended to identify key features of the claimed subject matter, but it is not intended to be used to limit the scope of the claimed subject matter.

DETAILED DESCRIPTION

Embodiments of the invention relate to the partial authentication of devices and applications for access to incremental information in a server or a database. The embodiments of the invention may be applicable to a wide range of computer-based devices and programs, in particular, to mobile user devices with limited user interface resources, such as smart phones and portable pad computers. In many application scenarios, the users of mobile devices may initially want to access an office server or a private computer network only to find out whether there is any new information or items that they should be aware of or act on. For example, a user at an airport may want to use a smart phone to quickly check the user's email account for the number of new or unread emails, or the identity of the new email senders.

Such information is generally less sensitive in nature and could require less protection than the full information itself, e.g., the email contents. Current mobile authentication applications and services, however, typically require the users to be fully authenticated in order to access any of the information at all. These applications and services often require the users to provide complete user or device security credentials, e.g., user passwords, to be authorized to access private resources. This full authentication is generally not suitable for mobile applications due to, for example, the limited resources of the mobile devices, limited data access needs, or user time constraints. The embodiments of the invention address these concerns in enabling a partial authentication to allow a user to access an initial portion of the information, and continue with subsequent partial authentications to access remaining information increments as desired.

The exemplary embodiments of the invention may divide a user's password into multiple parts and allow the user to access subsets of information based on successful authentications of the individual password parts. The user may enter the rest of the password parts for full access to the information, or to gain access to the full information from the start by initially entering the full password.

Figure 1:
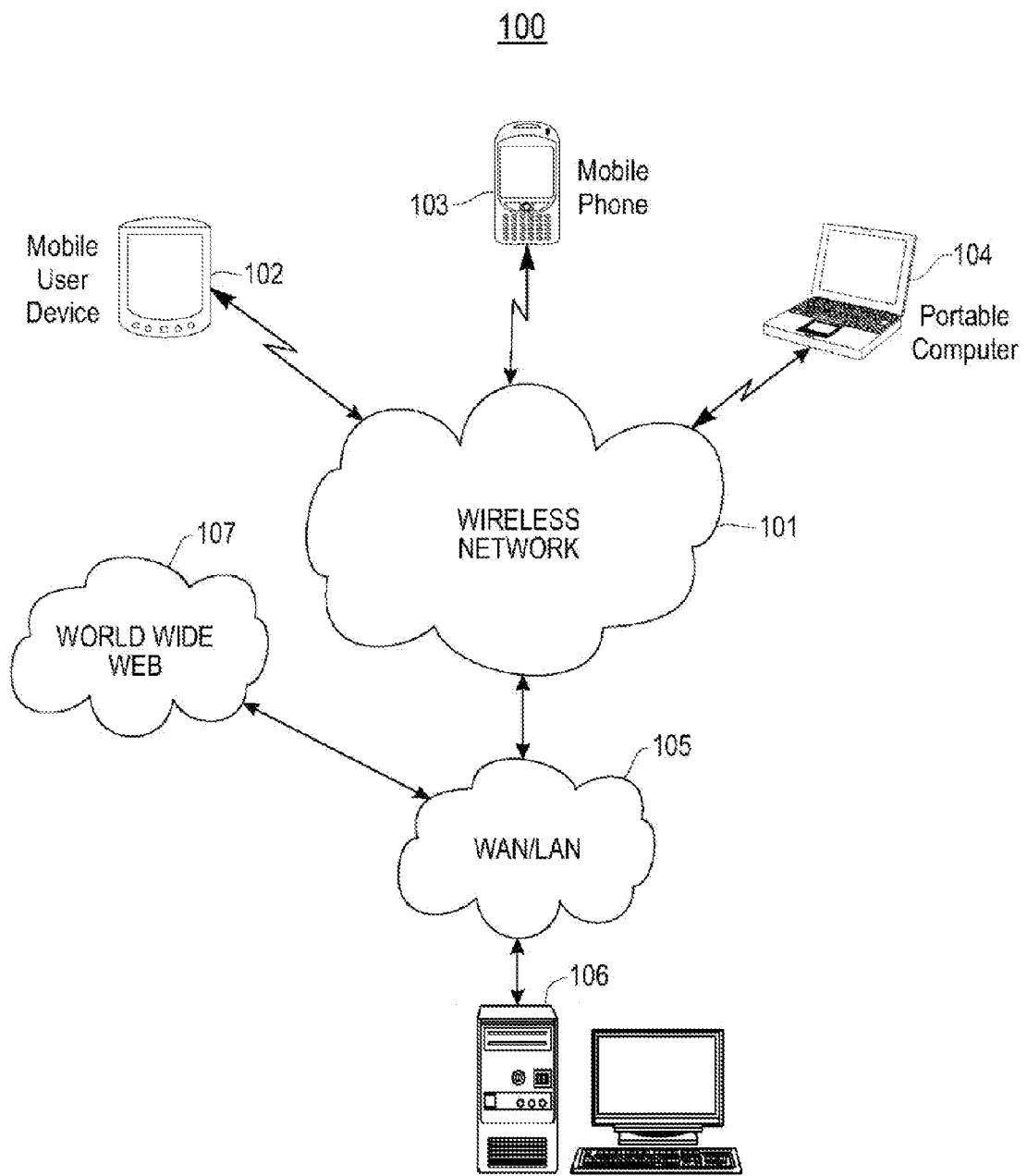
FIG. 1 illustrates an exemplary block diagram of a network environment in which mobile devices and applications may be authenticated to access partial information, according to an embodiment of the invention.

Referring now to the drawings and in particular to FIG. 1, there is illustrated an exemplary block diagram of a network environment in which users may access partial information based on partial user authentication, according to embodiments of the invention. The illustrated network environment 100 may include a wireless network 101 through which a mobile user device 102, mobile phone 103, or a portable computer 104 may access other connected private or public networks. Wireless network 101 may be based on radio communications such as WiFi, WiMAX, or other network technologies. Mobile user device 102 may be a hand-held pad computer or other mobile communication devices that have the capability to access remote servers through a network.

Wireless network 101 may be connected to a private or third-party wide area network (WAN) or a local area network (LAN) 105. Access to WAN/LAN 105 generally requires authentication to and authorization by the network owner. In the case where WAN/LAN 105 is a private network, a user may use a mobile device 102, mobile phone 103, or computer 104 to access a private server 106 and communicate with other computers in the private network, such as computer 107, through the private WAN/LAN 105. Further, a private WAN/LAN 105 may be connected to the World Wide Web 108 through appropriate firewall protection.

Figure 2:
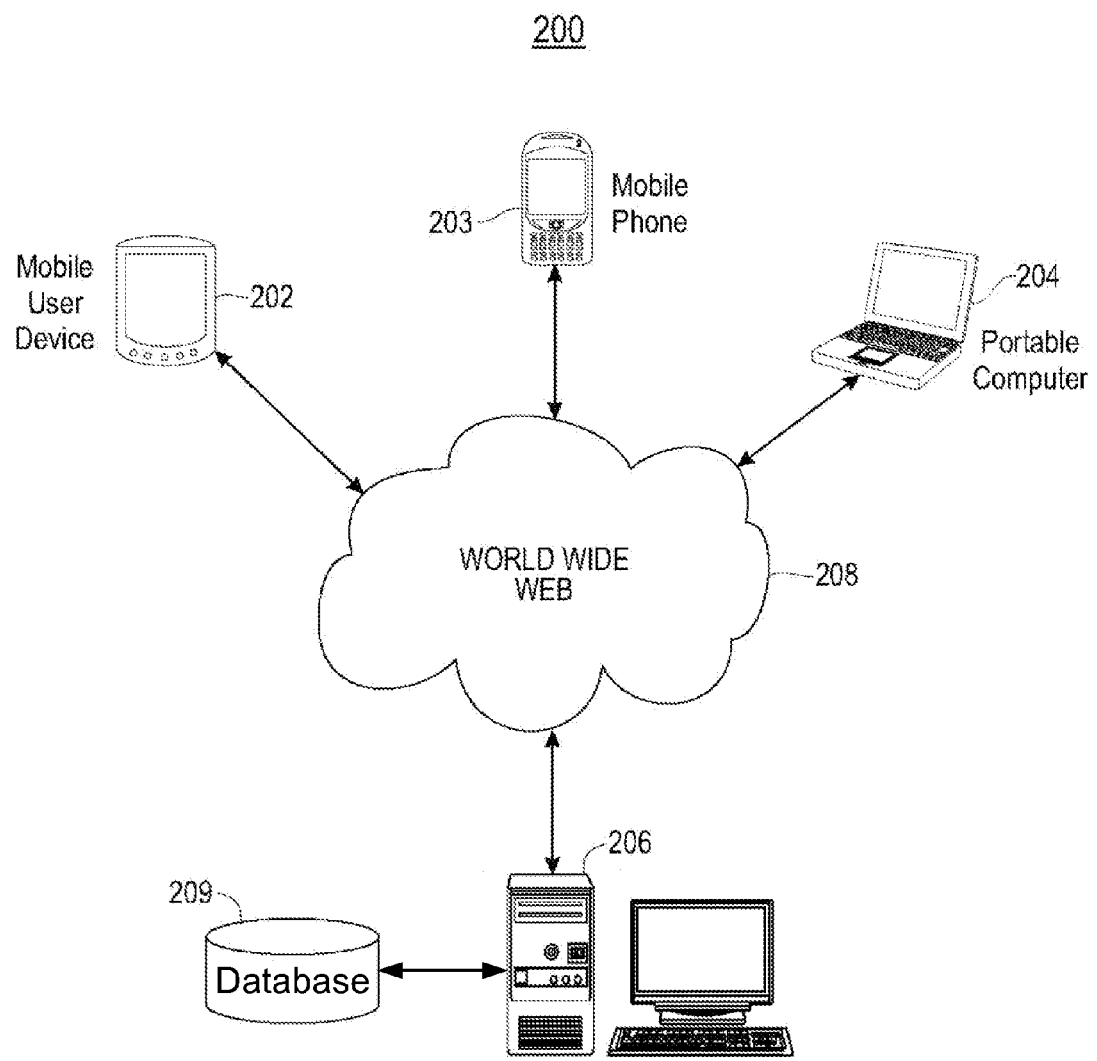
FIG. 2 illustrates an exemplary block diagram of a World Wide Web environment for authenticating mobile devices and applications to access partial information, according to an embodiment of the invention.

FIG. 2 illustrates an exemplary block diagram of a World Wide Web environment for incrementally accessing information in a remote computer based on partial authentication, according to an embodiment of the invention. In the illustrated environment 200, user devices 202-204 may access the World Wide Web 208 through a wired or wireless network. World Wide Web 208 represents public and private computer networks that are interconnected to allow access, typically with appropriate security protection mechanisms. Database server 206 may be a public or private server with connection to the World Wide Web 208 to allow user devices 202-204 to partially authenticate with the server 206 in order to access information through the server 206. The database server 206 may be coupled to a database 209 that contains information that users may need access to, such as emails, enterprise data, public data, and private data.

Figure 3:
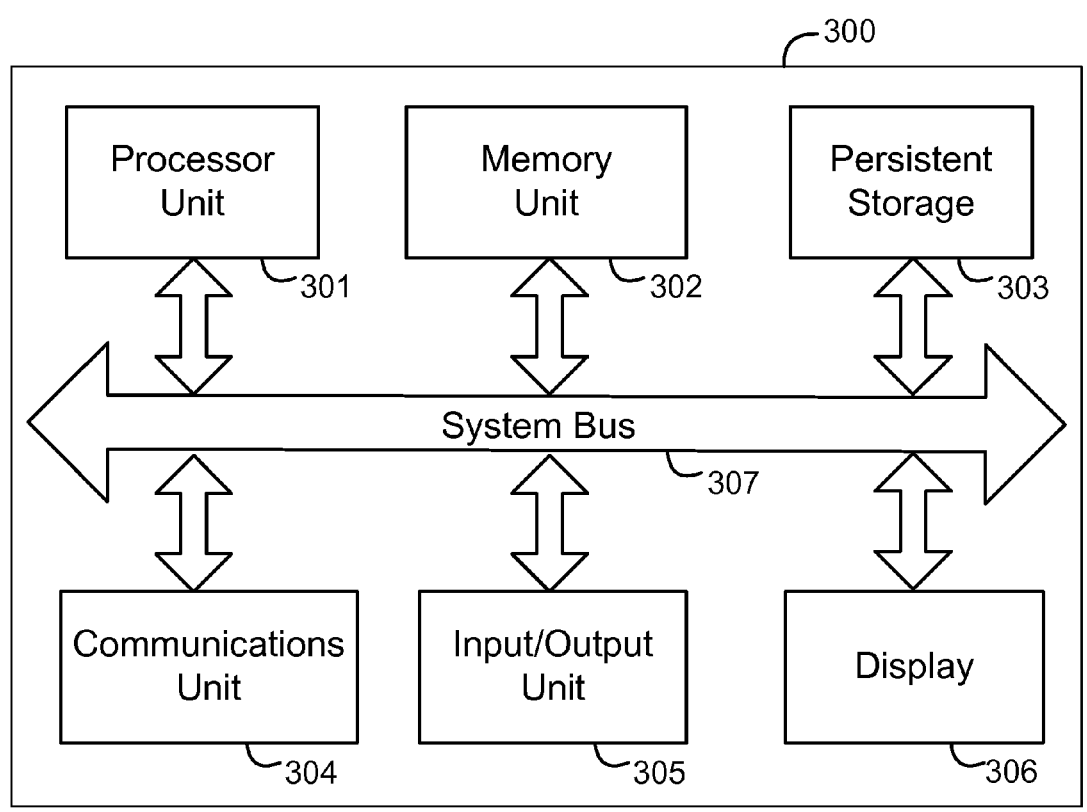
FIG. 3 illustrates an exemplary block diagram of a representative computer which may be part of a device from which a user may initiate a partial authentication to access incremental information in another computer, according to an embodiment of the invention.

FIG. 3 illustrates an exemplary block diagram of a representative computer which may be part of devices 102-104 from which a user may initiate a partial authentication to access incremental information, according to an embodiment of the invention. Data processing system 300 may include a processor unit 301, a memory unit 302, a persistent storage 303, a communications unit 304, an input/output unit 305, a display 306 and a system bus 307. Computer programs are typically stored in persistent storage 303 until they are needed for execution by an operating system, at which time the programs are brought into the memory unit 302 so that they can be directly accessed by the processor unit 301. The processor unit 301 may select a part of memory unit 302 to read and/or write by using an address that the processor 301 gives to memory 302 along with a request to read and/or write. Usually, the reading and interpretation of an encoded instruction at an address causes the processor 301 to fetch a subsequent instruction, either at a subsequent address or some other address. The processor unit 301, memory unit 302, persistent storage 303, communications unit 304, input/output unit 305, and display 306 may interface with each other through the system bus 307.

Figure 4:
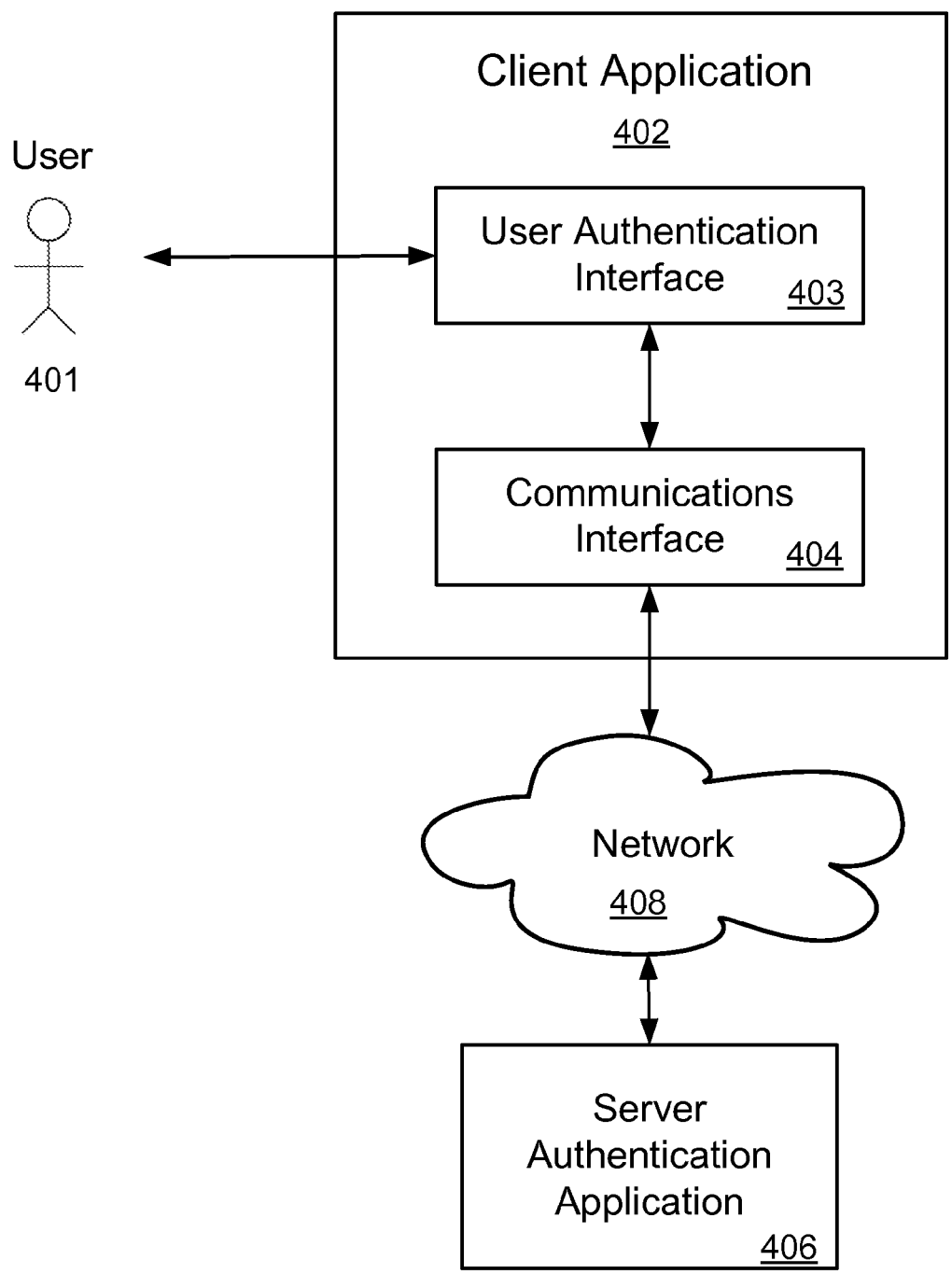
FIG. 4 illustrates an exemplary computer configuration in which a user may initiate a partial authentication for access to portions of data in a database, according to an embodiment of the invention.

FIG. 4 illustrates an exemplary computer configuration in which a user 401 may initiate a partial authentication in order to be authorized to access portions of data in a database.

Although the illustrated computer configuration uses a client-server environment as an example, embodiments of the invention are not limited to a client-server environment and may be applicable to other computer applications. In an exemplary embodiment, the user 401 may request the partial authentication through a client application 402 that operates on a portable computer-based user device such as pad computer 102 and mobile phone 103. The client application 402 may communicate with an authentication application 406 that operates on a server 106 (in FIG. 1) to which the client devices 102-103 is connected through a network 408. The data that the user 401 is attempting to access may reside in a database accessible to the server 106, such as database 209 in FIG. 2.

Client application 402 may comprise a user authentication interface 403 for interacting with user 401 during an authentication session. Authentication information, such as user credentials, user menus and data presented to the user 401, and user-system transaction messages, may be communicated between the user authentication interface 402 and server authentication application 406 through communications interface 404.

As an example of a partial authentication by the server authentication application 406, during a log-in session with the user authentication interface 402, the user 401 may provide a portion of a log-in user password, such as a predetermined number the initial characters in the user password. The communications interface 404 may transmit this password segment to the server authentication application 406 through the network 408. The server authentication application 406 may process a partial authentication on the provided password segment using an embodiment of the invention as described below with reference to FIGS. 5-9. The server authentication application 406 may respond to the user 401 during the partial authentication through user authentication interface 402 and communications interface 404.

Figure 5:
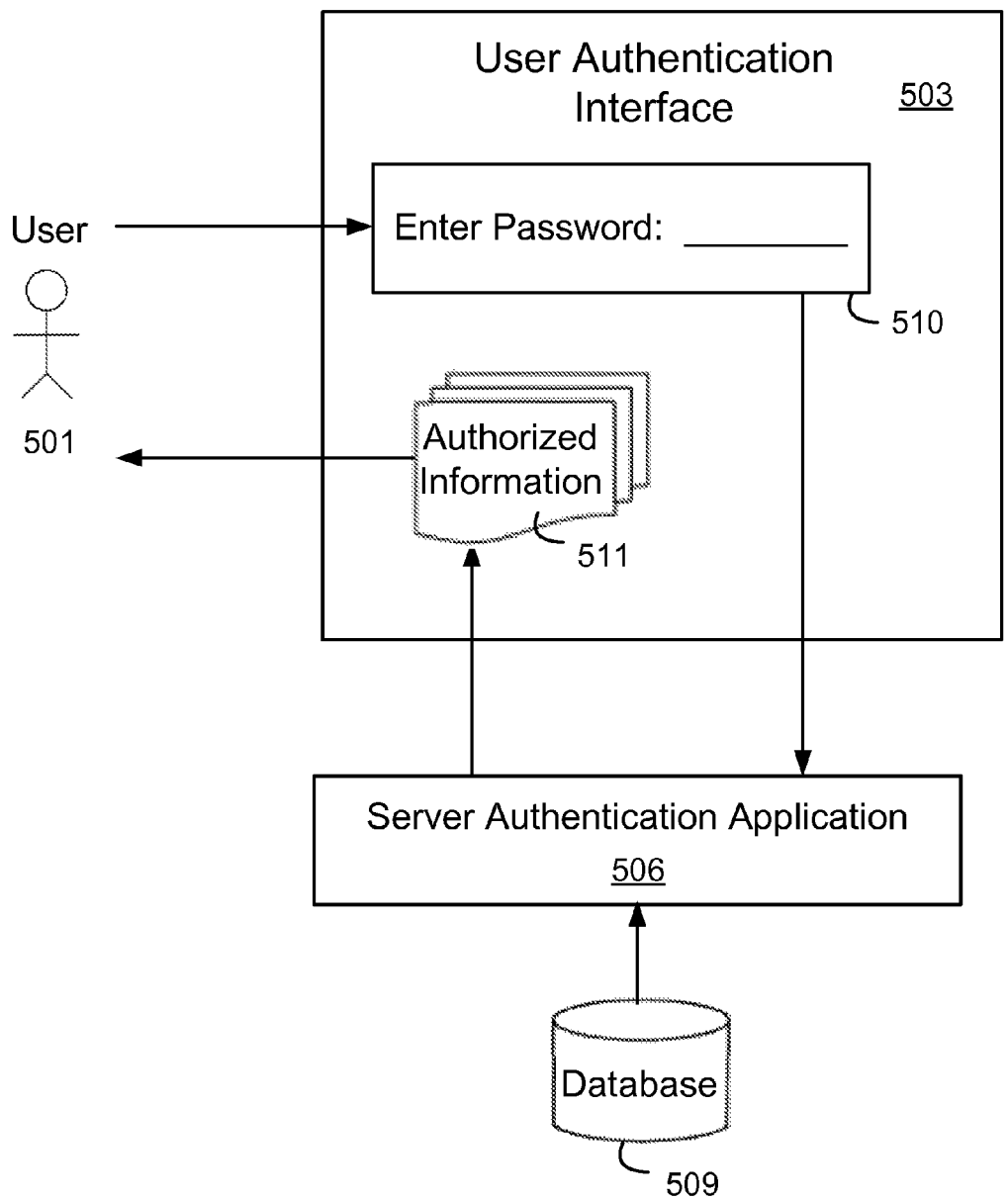
FIG. 5 illustrates an exemplary user authentication interface through which a user may provide credentials for a partial authentication to access incremental information, according to an embodiment of the invention.

FIG. 5 illustrates an exemplary embodiment of a user authentication interface 503 that may be used for a partial access authentication according to aspects of the invention. The user authentication interface 503 may include a password field 510 in which a user 501 may enter a user password or a password segment to be authenticated by a server authentication application 506. If the authentication is successful, the server authentication application 506 may grant the user access to information in a database 509 that the user 501 is entitled to, as determined in advance by a data management policy. For example, if the database 509 contains emails that belong to many users in a company, then once a user authentication is successful, the authenticated user may access the user's own emails, but not those that belong to the other users. Once the user's authentication is successful, the user authentication interface 503 may return to the user 501 the information that the user is authorized to access in the form of authorized information 511.

When the user 501 provides a user password in the password field 510, the user may enter a full password or a partial password, according to an embodiment of the invention. If the user 501 initially enters the full password, then the server authentication application 506 may authorize the user 501 to access all of the information in database 509 that the user 501 is entitled to, e.g., all of the user's own emails. If the user enters a partial password, for example, the first 3 characters of the user's password, then the server authentication application 506 may authorize the user 501 to access only a limited portion of the data, such as the number of new or unread emails but not the email contents, according to the embodiment of the invention. The particular data portion that the user 501 is authorized for access in response to a successful authentication of the initial password characters, and the required number of characters that need to be entered, may be established in advance by the user, the server authentication application 509, or both.

Once the user 501 is successfully authenticated to access a data portion corresponding to the initial password segment, the user may provide subsequent segments in the password to be authenticated for access to other data portions in the database 509 that the user 501 may also be entitled to. For example, a successful verification of the next segment in the user password may allow the user 501 to read the newly received and unread emails in the database 509. The authentication of multiple user password segments and access to incremental data associated with the successfully authenticated password segments are described in detail below in reference to FIGS. 6-9.

Figure 6:
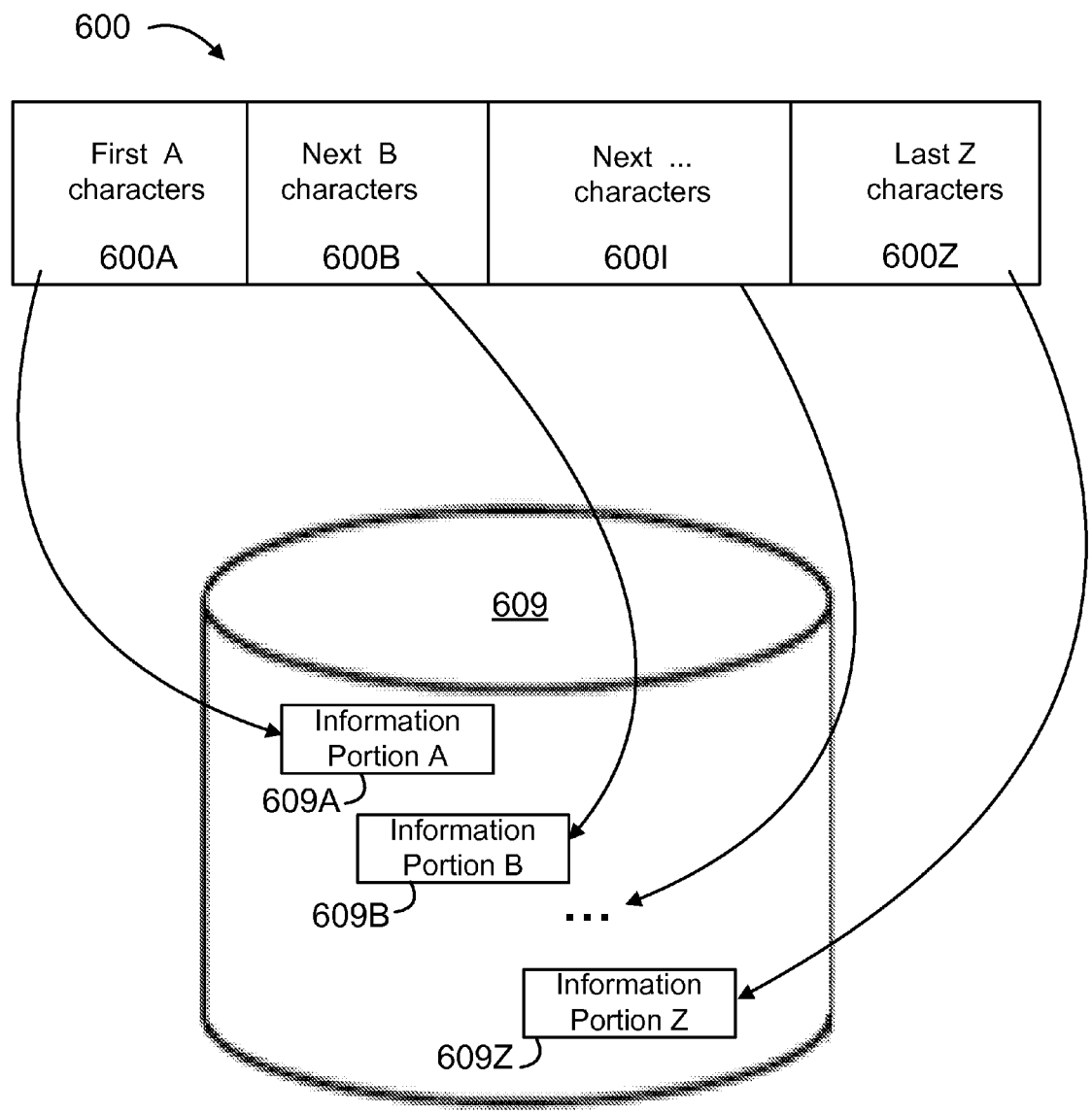
FIG. 6 illustrates an exemplary partial authentication to access incremental data in a database, according to an embodiment of the invention.

FIG. 6 illustrates an example of a partial authentication for access to incremental data in a database, according to an embodiment of the disclosure. The partial authentication may be based on a user password 600 that has been partitioned into multiple segments 600A, 600B, . . . , and 600Z. The initial password segment 600A may include the first (a) number of characters in the password 600. The second password segment 600B may include the next (b) number of characters in the password 600, and so forth. The last password segment 600Z may include the last (z) number of characters in the password 600. The values of (a), (b), . . . , and (z) may be established in advance by the user 501 and communicated to the server authentication application 506.

As the user 501 provides the initial password segment 600A, the server authentication application 506 may verify the password segment 600A against the value for the segment 600A as previously established and stored, for example, in the server 206. If the verification of the password segment 600A is successful, then the server authentication application 509 may authorize the user 501 to access information portion 609A in a database 609. Information portion 609A may be, for example, the number of new unread emails that the user has received since the user's last sign-in to the user's email system. Similar partial information that a user may be authenticated to access include data in different security categories such as public data, private data, non-confidential data, and confidential data. Such security classifications may be applicable to an application environment in which data security is a concern, for example, as in the situation where the user is accessing a private server through a public network such as the Internet.

The user 501 may continue to provide subsequent password segments, e.g., 600B, . . . , 600Z, to be authenticated by the server authentication application 506 to access information portions 609B, . . . , and 609Z respectively associated with the password segments 600B, . . . , and 600Z. The partitioning of data in database 509 into the information increments 609B, . . . , and 609Z may be based on factors that are relevant to the user application such as the size of the data, user authorization level, and the desired level of information detail. In one embodiment of the invention, the user may continue to enter subsequent password segments even though the initial segment was not successfully authenticated. In the case where the information returned by the server authentication application 506 is obfuscated, as described below with reference to FIG. 7, the user would not know that the provided password segment was incorrect because the response is obfuscated. The authentication of the all subsequent password segments would also be unsuccessful if the first portion of the password was incorrect.

Figure 7:
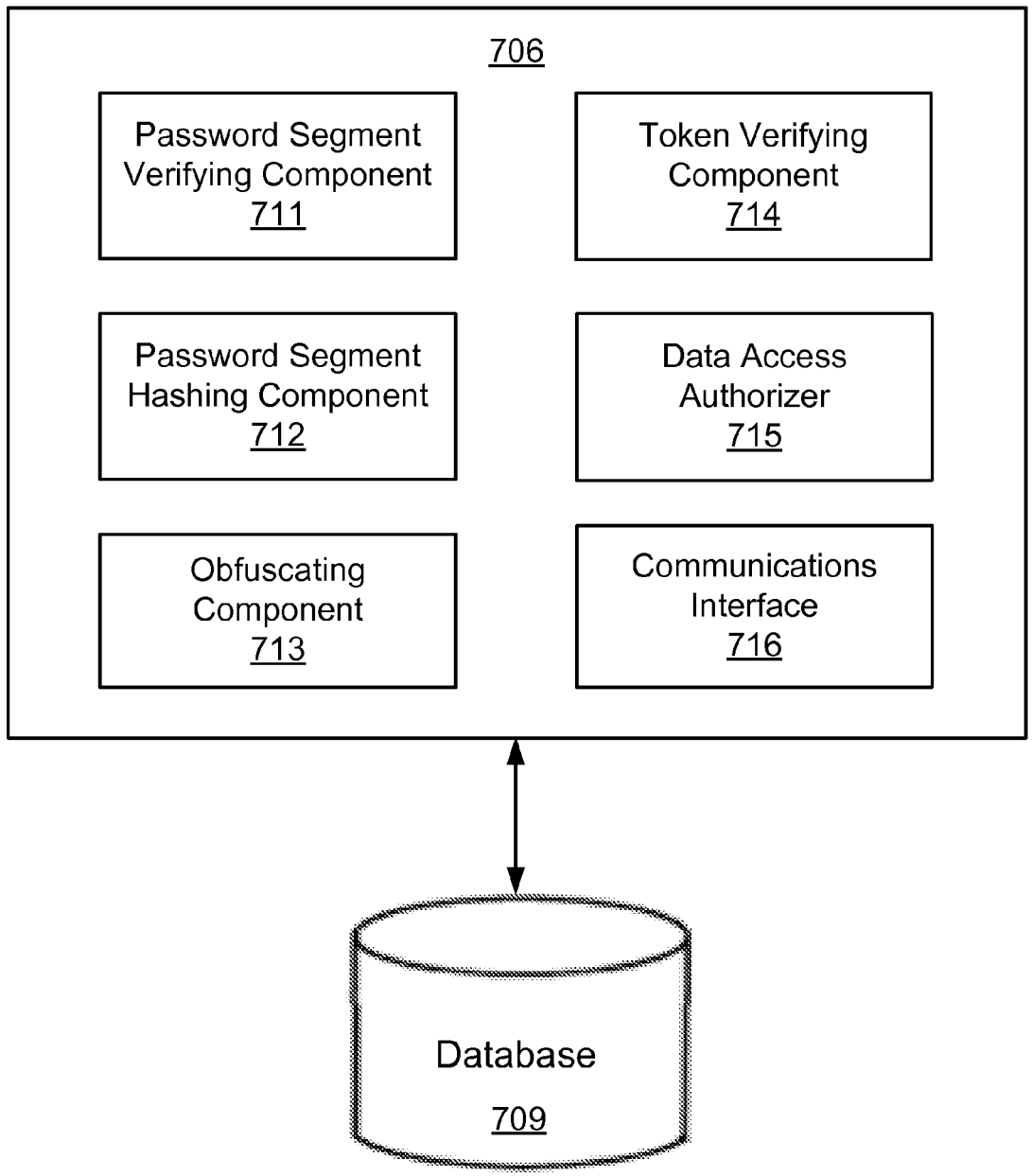
FIG. 7 illustrates exemplary block diagram of a server authentication system for partial authentication to allow access to incremental data in a database, according to an embodiment of the invention.

FIG. 7 illustrates an exemplary block diagram of a server authentication system 706 for partial authentication to allow access to incremental data, according to an embodiment of the invention. The server authentication system 706 may comprise a password segment verifying component 711 for comparing a password segment that the user has entered against a previously stored value for that segment. If the entered password segment matches the previously stored value for the segment, then the segment authentication is successful and the server authentication system 706 may continue with its next operation, for example, granting the user access to the partial information associated with the authenticated password segment.

To improve the level of protection in the authentication process, the server authentication system 706 may include a password segment hashing component 712 for hashing the values of the password segments 601A . . . 601Z before storing them, for example, in a server 206. A hashing function (h) may be applied to a password segment value (i) to generate a hashed value h(i) which may then be stored in the server 206 instead of the value (i) itself. If the password segments 601A . . . 601Z have been hashed and stored in the form of their hashed values, then the user-entered password segments would also need be hashed before they are compared to their hashed values during the authentication process.

The server authentication system 706 may include an obfuscating component 713 for obfuscating the information that is returned to the user 501 in response to the user's full authentication or partial authentication to access data. An obfuscation is an operation that encodes certain messages in the form of other messages to hide the true meanings of the original messages from those who do not have the knowledge of the mapping between the original messages and the encoded messages. For example, instead of responding to the user 501 with the message "there are new unread emails in the account", the obfuscating component 713 may return the message "it's sunny" which the user understands it to mean that there are new unread emails in the account based on the established mapping. Similarly, instead of returning to the user the message "there are no unread emails in the account", the obfuscating component 713 may return the message "it's cloudy", which the user would understand it to mean that there are no unread emails in the account based on the mapping.

As another example of partial authentication and obfuscation, consider an email system in which a user may be authenticated for a full access to the email system with a password that is 8-character long. The user may have set up the following levels of access with the authentication application:

The first 3 characters allow to the user to see the number of unread (new) emails;

The next 2 characters allow access to the names of the email senders; and

The next 3 characters complete the password and give full access to the emails.

The obfuscated responses to the first password segment in all cases may be defined as a picture of a group of people. If the first password segment is incorrect, there are some people in the picture with their eyes closed. If the first password segment was correct, everyone in the picture will have their eyes open and the number of smiling faces in the picture corresponds to the number of unread emails.

The obfuscation scheme could be defined by the user or setup at some initial registration step so that it varies from user to user. An attacker of the authentication would not know the meanings of the obfuscated responses. In addition, since trying to authenticate a first part of the password gives no positive or negative feedback to the attacker, the attacker would not have any advantage in guessing the full 8-character password.

The server authentication system 706 may further comprise a token verifying component 714 for enhancing the level of protection in an authentication to access partial data. For example, the server authentication system 706 may provide an access token that is saved on a user's mobile device. When the user attempts a full authentication or partial authentication in the future, the token verifying component 714 would use the access token as a condition to begin the authentication of the full password or a password segment to authorize access to data.

In a partial authentication, the access token may allow a previously authenticated device to access an initial portion of data; for example, the number of unread emails in the user's account. The user would need to be successfully authenticated with the subsequent password segments in order to have access to the remaining data increments. In the case of authenticating from an untrusted device, the access token would be absent and the token verifying component 714 may require an additional authentication step from the user if the server authentication system 706 is configured with a token verifying component 714. The additional authentication step may verify that the device includes the necessary credentials to access the server.

The server authentication system 706 may comprise a data access authorizer 715 for granting the user 501 or device 102 access to full or incremental data in database 709 once the user 501 or device 102 is successfully authenticated. The data access authorizer 715 may be responsible for keeping track of the data increments that the user or device has been authorized to access and the level of information detail the user 501 or device 102 may access during a particular authenticated session. The server authentication system 706 may return authorized data and authentication information to the authenticated user and device through a communications interface 716.

Figure 8:
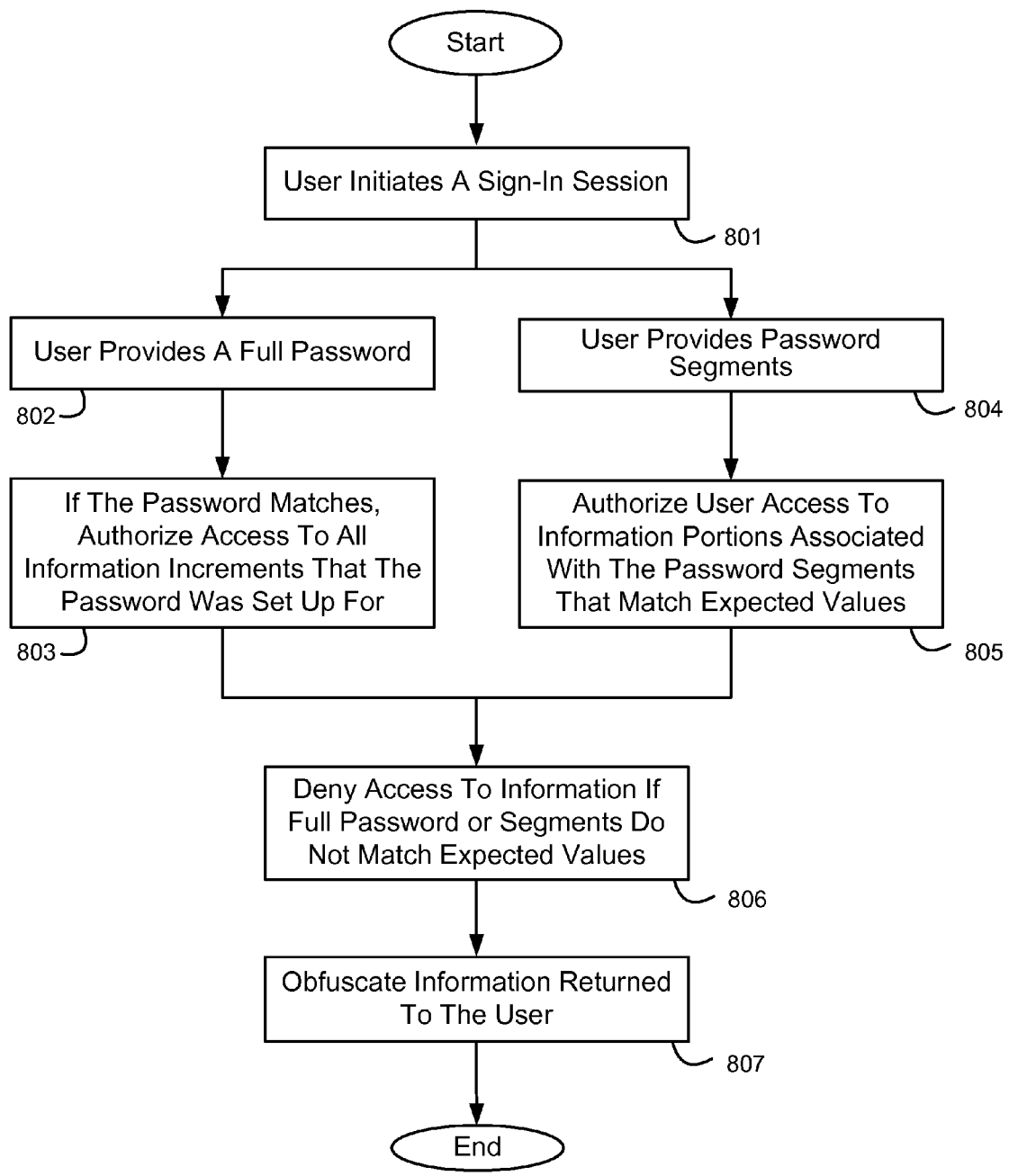
FIG. 8 is a flow chart of an exemplary process for authenticating a user or a device for access to full or incremental data, according to an embodiment of the invention.

FIG. 8 is a flow chart of an exemplary process for authenticating a user or a device for access to full or incremental data, according to an embodiment of the invention. The process may begin at step 801 with a user 501 initiating a sign-in session, for example, with a client application 402 running on a user's device 103. The user 501 may initially provide a complete password that includes all the password segments, in step 802. If the user-provided password matches the value of the password that has previously been stored in an authenticating server, then the authenticating server may authorize the user to access all of the data increments that the user is entitled to, per step 803. If the user's password does not match the expected password value, then the authenticating server may deny the user access to data, per step 806.

Alternatively, instead of initially providing a full password, the user may enter segments of the password for partial authentication, as shown by step 804. The authenticating server may then perform a partial authentication operation on the entered password segments and grant user access to data portions respectively associated with the segments that are successfully authenticated, per step 805. If any of the password segment fails the partial authentication process, then the authenticating server may prevent the user from accessing the data increment that is associated with the failed password segment, in step 806. To provide additional protection to the authentication process, the authenticating server may obfuscate the information returned to the user in step 807. Details on an exemplary process for partial authentication are next described with reference to FIG. 9.

Figure 9:
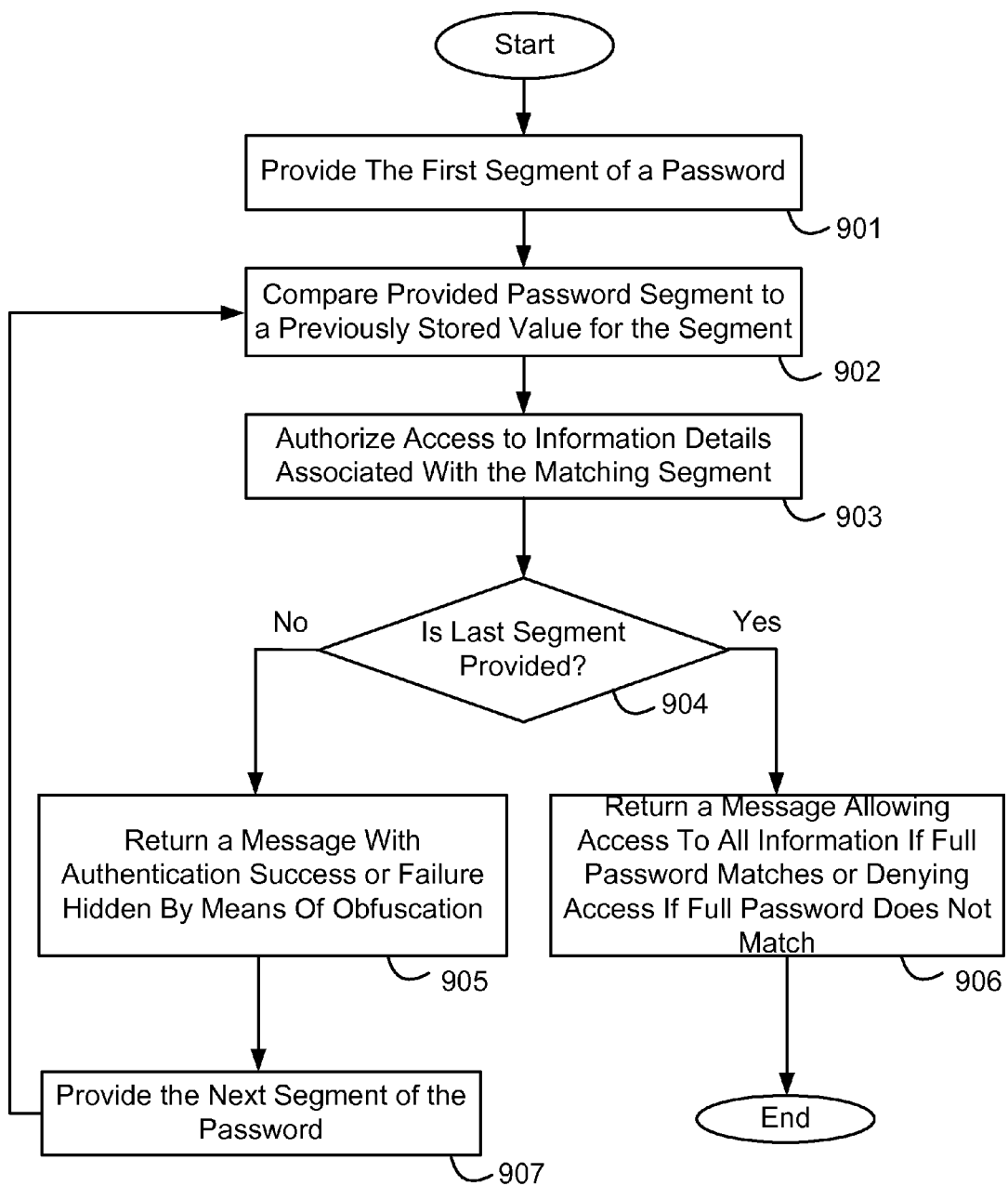
FIG. 9 is a flow chart of an exemplary process for partial authentication to access incremental data in a database, according to an embodiment of the invention.

FIG. 9 is a flow chart of an exemplary process for partial authentication to access increments of data in a database, according to an embodiment of the disclosure. At step 901, the user may provide the first segment of a user password to a data server as part of an authentication process. An authentication application operating on the server may compare the first password segment to a previously stored value for this password segment, in step 902. If the provided password segment matches its stored value, then the server authentication application may authorize the user to access information details associated with the matching password segment.

If the provided password segment is not the last segment in the password, then the server authentication application may return a message indicating whether the authentication of the segment was successful or unsuccessful. The server authentication application may obfuscate this message to hide the actual meaning of the message, per step 905. The user may provide the next password for authentication, in step 907.

If the recently provided password segment is the last segment in the password a determined in step 904, then the server authentication application may return a message to the user, in step 906. If all of the entered password segments matched their values, then the message may indicate an authorized access to all the information that the user is entitled to. On the other hand, if the full password does not match, then the server authentication application may deny user access to the entire user information.

The subject matter described above is provided by way of illustration only and should not be construed as limiting. Various modifications and substitutions of the described components and operations can be made by those skilled in the art without departing from the spirit and scope of the present invention defined in the following claims, the scope of which is to be accorded the broadest interpretation so as to encompass such modifications and equivalent structures. As will be appreciated by those skilled in the art, the systems, methods, and procedures described herein can be embodied in a programmable computer, computer executable software, or digital circuitry. The software can be stored on computer readable media. For example, computer readable media can include a floppy disk, RAM, ROM, hard disk, removable media, flash memory, a "memory stick", optical media, magneto-optical media, CD-ROM, etc.

As will be appreciated by one skilled in the art, aspects of the present invention may be embodied as a method, system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium is a computer readable storage medium. A computer readable storage medium may be, for example, but not limited to, an electronic, magnetic, optical, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a wide area network (WAN), Ethernet, SCSI, iSCSI, Fibre Channel, Fibre Channel over Ethernet, and Infiniband, or the connection may be made to an external computer, for example, through the Internet using an Internet Service Provider.

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures described above illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method comprising:
providing a segment of a password to a server communication device, the provided segment consisting of a first segment of the password, wherein the password comprises a plurality of segments each associated with an increment of system information, wherein the first segment of a password is associated with new system information;
each subsequent segment of the password accessing an additional increment of the system information;
in response to the first password segment satisfying an expected first value, the server authorizing access to a first information portion associated with the first password segment; and
in response to receiving a subsequent password segment of the password and the subsequent password segment satisfying an expected subsequent value, authorizing access to system information portion associated with the subsequent password segment, the system information portion being cumulative to prior system information.

2. The method of claim 1, further comprising obfuscating the information returned in response to a provided password segment, the returned information being a visual representation, wherein detail within the visual representation indicates a quantity of information available to access.

3. The method of claim 1, further comprising hashing the password segments.

4. The method of claim 1 further comprising, in response to multiple password segments being provided to the information system and satisfying expected respective values, authorizing access to multiple information portions respectively associated with the multiple password segments.

5. The method of claim 1, wherein the information portions comprise incremental quantities of information detail.

6. A computer program product comprising a computer readable storage device having computer readable program code embodied therewith, the computer readable program code comprising:
computer readable program code configured to provide a segment of a password to a server communication device, the segment consisting of a first segment of the password, wherein the password comprises a plurality of segments each associated with an increment of system information, the first segment of a password is associated with new system information, and each subsequent segment of the password accesses an additional increment of the system information;
computer readable program code configured to authorize access, in response to the first password segment satisfying an expected first value, to an information portion associated with the first password segment, and in response to receiving a subsequent password segment of the password and the subsequent password segment satisfying an expected subsequent value, the program code to authorize access to system information portion associated with the subsequent password segment, the system information portion being cumulative to prior system information.

7. The computer program product of claim 6, further comprising computer readable program code configured to obfuscate information returned in response to a provided password segment, the returned information being a visual representation, wherein a visual detail within the representation indicates a quantity of information available to access.

8. The computer program product of claim 6, further comprising computer readable program code configured to authorize access, in response to all of the password segments being provided initially, to all of the information portions.

9. The computer program product of claim 6, wherein the information portions comprise incremental quantities of information detail.

10. The computer program product of claim 6, wherein the information is accessed from a mobile device.

11. A system comprising:
an information server;
a client coupled to the server by a network, said client providing the server with a segment of a password, the password segment consisting of a first segment of the password, wherein the password comprises a plurality of segments each associated with an increment of system information in the server, the first segment of a password associated with new information, and each subsequent segment of the password accesses an additional increment of the information;
wherein in response to the first password segment satisfying an expected first value, the server authorizes access to an information portion associated with the first password segment, and in response to receiving a subsequent password segment and the subsequent password segment satisfying an expected subsequent value, the server authorizes access to system information associated with the subsequent password segment, the system information portion being cumulative to prior system information.

12. The system of claim 11, wherein the server obfuscates information returned to the client, the return information being a visual representation, wherein a visual detail within the representation indicates a quantity of information available to access.

13. The system of claim 11, wherein the server hashes the password segments.

14. The system of claim 11, wherein in response to multiple password segments satisfying expected respective values, the server authorizes access to multiple information portions respectively associated with the multiple password segments.

15. The system of claim 11, wherein the information access is conditioned upon a previously stored token being present in the client.

16. The system of claim 11, wherein the client is a mobile device.

17. The system of claim 16, wherein the mobile device is a telephone.

* * * * *